(12) United States Patent  (10) Patent No.: US 8,508,512 B2
Kojima  (45) Date of Patent: Aug. 13, 2013

(54) PORTABLE TERMINAL EQUIPMENT AND A METHOD OF RECEIVING INPUT

(75) Inventor: Takashi Kojima, Tokyo (JP)

(73) Assignee: NEC Corporation, Tokyo (JP)

( * ) Notice: Subject to any disclaimer, the term of this patent is extended or adjusted under 35 U.S.C. 154(b) by 662 days.

(21) Appl. No.: 12/281,503

(22) PCT Filed: Jan. 30, 2007

(86) PCT No.: PCT/JP2007/051437
§ 371 (c)(1),
(2), (4) Date: Sep. 3, 2008

(87) PCT Pub. No.: WO2007/099728
PCT Pub. Date: Sep. 7, 2007

(65) Prior Publication Data
US 2009/0033629 A1  Feb. 5, 2009

(30) Foreign Application Priority Data
Mar. 3, 2006  (JP) ................................. 2006-057617

(51) Int. Cl.
*G06F 3/033* (2006.01)
(52) U.S. Cl.
USPC .......................................... 345/184; 345/156
(58) Field of Classification Search
USPC ......................................................... 345/184
See application file for complete search history.

(56) References Cited

U.S. PATENT DOCUMENTS 6,489,950 B1 * 12/2002 Griffin et al. ................. 345/168
2003/0222853 A1 * 12/2003 Kim .............................. 345/169

FOREIGN PATENT DOCUMENTS

| EP | 1394666 A1 | 3/2004 |
|---|---|---|
| JP | 2003015811 A | 1/2003 |
| JP | 2004280542 A | 10/2004 |
| JP | 2004327233 A | 11/2004 |
| JP | 2005167495 A | 6/2005 |
| WO | 2005109165 A2 | 11/2005 |

OTHER PUBLICATIONS

International Search Report for PCT/JP2007/051437 mailed Mar. 13, 2007.
Extended European Search Report for EP 07 70 7668 dated Aug. 14, 2009.

* cited by examiner

*Primary Examiner* — Kevin M Nguyen
*Assistant Examiner* — Cory Almeida

(57) ABSTRACT

Provided is a portable terminal equipment which can prevent operation keys from being increased and which is capable of reducing the numbers of pushing the operation keys down at the time of input of characters. The portable terminal equipment has a plurality of operation keys (10~21) to which characters and functions are assigned are provided in an operation section to be capable of being pushed down, being released from being pushed down, and sliding, a touch sensor section (5) which detects each of the operation keys being pushed down and being released from being pushed down, a moving sensor (2) which detects the operation key sliding, and a control section (101) which executes a function assigned to the operation key, when the touch sensor section (5) detects the operation key being pushed down and then detects the operation key being released from being pushed down, and which makes a character assigned to the pushed down operation key be displayed in a display section (3), when the moving sensor (2) detects the operation key sliding while the touch sensor section (5) is detecting the operation key being pushed down.

7 Claims, 5 Drawing Sheets

PORTABLE TERMINAL EQUIPMENT AND A METHOD OF RECEIVING INPUT

TECHNICAL FIELD

The present invention relates to a portable terminal equipment and a method of receiving input, in particular to a portable terminal equipment capable of key input operations and a method of receiving input thereof.

BACKGROUND TECHNIQUE

In a portable terminal equipment, such as a portable telephone, and the like, provided are operation keys for rendering an user to operate the portable terminal equipment. As the operation keys, there are ten keys, function keys, direction keys, and pointing devices. The user conducts an input of a character, an execution of a function, or the like, by operating these operation keys.

In a case that the user inputs the character by the use of the operation keys, the user must push the ten keys down many times. This had been possibly giving stress to the user. Further, in a case that the user operates the operation keys by his one hand, a range in which his fingers of the one hand move becomes wide. This possibly makes the user have a feeling of difficulty or stress in his operation of the operation keys by one hand.

The patent reference 1 (Official gazette of unexamined Japanese Patent Publication No. 2003-15811) discloses an input apparatus which has input keys 12 for inputting characters, which detects moving of a position pushed down and being pushed down in the input keys 12, and which can input a character in response to a result of detection of the moving of the position. In the input apparatus, if the input key 12 is pushed down, characters (for example, 「あ」、「か」、and the like) representing groups of characters and numbers are displayed in response to a position where the input key 12 is pushed down. Thereafter, if the position where the input key 12 is pushed down is moved in a condition that the key is being pushed down, each character (for example, 「い」、「う」、「え」、「お」) included in the groups of characters and numbers is sequentially displayed in response to a distance of the moving of the position.

Thereby, it has become possible to release the stress that the user feels by pushing the ten keys down many times.

Patent reference 1: Official gazette of unexamined Japanese Patent Publication No. 2003-15811

DISCLOSURE OF THE INVENTION

Problem to be Solved by the Invention

In recent years, it tends to increase numbers of operation keys provided in the portable terminal equipment. This requires a technique capable of realizing the portable terminal equipment smaller in size and lower in cost. In the input apparatus disclosed in the patent reference 1, when input of a character has been conducted, it is necessary to push down a predetermined function key, and the like, for making the character be settled in addition to the input keys 12. Further, in order to enable the user to instruct an execution of the function other than the input of the character and a settlement thereof, it is required that an another function key, and the like are provided as an operation key for instruction of the execution of the function.

The present invention has been made for solving a problem in the above-described conventional technique. It is an object of the present invention to provide a portable terminal equipment which can prevent operation keys from being increased and which is capable of reducing the numbers of pushing the operation keys down at the time of input of characters and a method of receiving input thereof.

Means for Solving the Problem

According to the present invention, there is provided a portable terminal equipment comprising:

a plurality of operation keys each to which a predetermined character and a predetermined function are assigned, and which are provided in an operation section so as to be capable of each being pushed down, each being released from a condition of being pushed down, and each sliding;

a display section which displays various information;

a touch sensor section which detects each of the operation keys being pushed down and being released from the condition of being pushed down;

a moving detecting section which detects each of the operation keys sliding; and a control section which executes the predetermined function assigned to each of the operation keys, when the touch sensor section detects each of the operation keys being pushed down and then detects each of the operation keys being released from the condition of being pushed down, the control section making the predetermined character assigned to each of the operation keys be displayed in the display section, when the moving detecting section detects each of the operation keys sliding while the touch sensor section is detecting each of the operation keys being pushed down.

Further, according to the present invention, there is provided a method of receiving input which is conducted by a portable terminal equipment including operation keys each to which a predetermined character and a predetermined function are assigned, and which are capable of each being pushed down, each being released from a condition of being pushed down, and each sliding, a touch sensor section which detects each of the operation keys being pushed down and being released from the condition of being pushed down, and a moving detecting section which detects each of the operation keys sliding, the method comprising the steps of:

an executing step for executing the predetermined function assigned to each of the operation keys, when the touch sensor section detects each of the operation keys being pushed down and then detects each of the operation keys being released from the condition of being pushed down; and a displaying step for displaying the predetermined character assigned to each of the operation keys, when the moving detecting section detects each of the operation keys sliding while the touch sensor section is detecting each of the operation keys being pushed down.

According to each invention mentioned above, when each of the operation keys is pushed down and then released from the condition of being pushed down, a function assigned to the operation key is executed. Further, when an operation key is slid while the operation key is being pushed down, a predetermined character assigned to the operation key is displayed.

Consequently, it becomes possible that one operation key receives an input of a character as well as an execution of the function. Accordingly, it becomes possible to prevent the operation keys from being increased.

Further, it is desirable that a plurality of characters are assigned to each of the operation keys, the control section makes a plurality of characters assigned to each of the operation keys be displayed sequentially in the display section, every time the moving detecting section detects each of the operation keys sliding while the touch sensor section is detecting each of the operation keys being pushed down, and thereafter, the control section makes one of the characters being displayed in the display section at that time be settled, when the touch sensor section detects each of the operation keys being released from the condition of being pushed down.

According to the invention mentioned above, predetermined characters are displayed sequentially, every time the operation key is slid while the operation key is being pushed down. Thereafter, when the operation key is released from the condition of being pushed down, the character being displayed at that time is settled.

Consequently, it becomes possible that numbers of pushing the operation keys down by the user after the user inputs a character are reduced. Accordingly, it becomes possible to release stress of the user by inputting characters.

Further, it is desirable that the control section makes the information displayed in the display section be scrolled, when the moving detecting section detects each of the operation keys sliding while the touch sensor section is not detecting each of the operation keys being pushed down.

According to the invention mentioned above, the information being displayed is scrolled, when the operation key is slid while the operation key is not being pushed down.

Consequently, it becomes possible to make the information being displayed be scrolled without newly adding an operation key to the portable terminal equipment for making the information be scrolled. Accordingly, it becomes possible to prevent the operation keys from being increased.

Further, it is desirable that the touch sensor section comprises a touch sensor located under the operation keys while the moving detecting section comprises a moving sensor.

According to the invention mentioned above, it becomes possible to prevent the operation keys from being increased comparatively at low cost.

Effects of the Invention

According to the present invention, it is possible comparatively at low cost to provide a portable terminal equipment which can prevent operation keys from being increased and which is capable of reducing the numbers of pushing the operation keys down at the time of input and settlement of characters.

The above described and the other objects, embodiments, and benefits of the present invention will become clear for skilled person in the art by the following detailed description in which preferable and concrete examples corresponding to the principle of the present invention are shown as embodiments and explained with reference to accompanying drawings.

Figure 1:
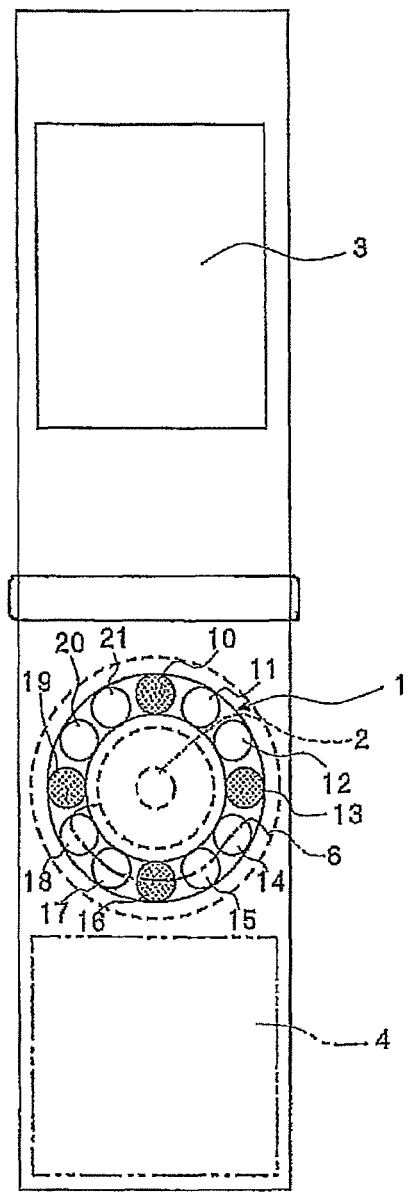
FIG. 1 is a plan view for showing a face side of a portable terminal equipment according to an embodiment of the present invention.

DESCRIPTION OF REFERENCE NUMERALS 1, 60, 70 operation section
2 moving sensor
3 display section
4 enlarged portion
5 touch sensor section
6 cutting line
7, 8 securing member
10~21 operation key
30~31 touch sensor
100 memory
101 control section
102 memorizing section

BEST MODE FOR CARRYING OUT THE INVENTION

Hereunder, a description is made about some preferable embodiments of the present invention with reference to the attached drawings.

FIG. 1 is a plan view for showing a face side of a portable terminal equipment according to an embodiment of the present invention. As clearly shown in FIG. 1, the portable terminal equipment comprises an operation section 1, a moving sensor 2, a display section 3 and an enlarged portion 4.

The operation section 1 is formed to be circular and is capable of being pushed down and released from the condition of being pushed down by the user. In addition, the operation section 1 is capable of sliding in a circumferential direction (capable of rotation).

The operation section 1 includes operation keys 10 through 21. Besides, the numbers of the operation keys are twelve in FIG. 1. However, the numbers of the operation keys are actually not restricted to twelve.

Let a case that the numbers of the operation keys are twelve be considered. In this case, if a rotation operation of the operation section 1 is finished at an angle that is not multiples of 30 degrees, it is desirable that the operation section 1 is automatically rotated from the angle of finishing the rotation operation to another angle of multiples of 30 degrees that is the most close to the angle.

The moving sensor 2 detects a slide of the operation section 1.

For example, in a case that the numbers of the operation keys are twelve, every time the operation section 1 is rotated by 30 degrees, the moving sensor 2 detects the rotations of the operation section 1.

The display section 3 displays various information.

The enlarged portion 4 is such a space that ten keys, and the like were provided conventionally. In this embodiment, the enlarged portion 4 is achieved as a space capable of adding various functions for the purpose of making the operation section 1 be small in size.

The operation keys 10 through 21 are pushed down, released from the condition of being pushed down, and slid by the user. Further, these operation keys are located on a peripheral surface of a circular operation section 1. Besides, when the operation section 1 is slid in a circumferential direction, the operation keys 10 through 21 are slid together with the operation section 1.

Figure 2:
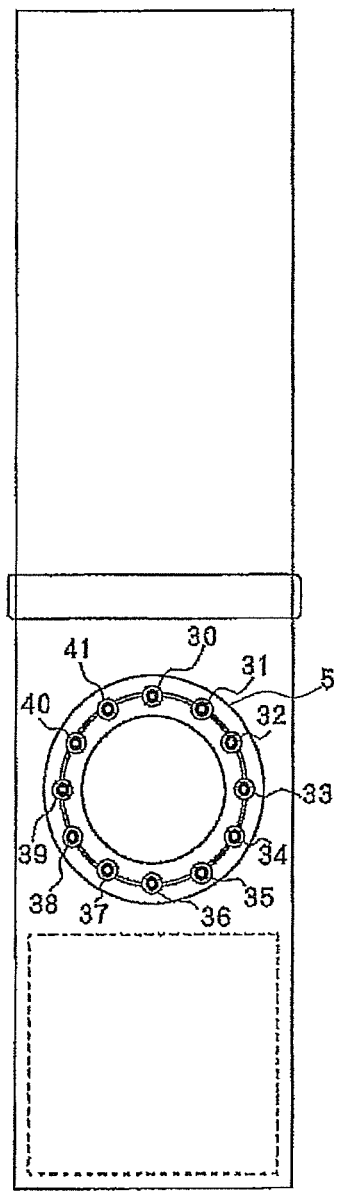
FIG. 2 is a plan view for showing an inner side of a lower portion of an operation section in a portable terminal equipment according to an embodiment of the present invention.

FIG. 2 is a plan view for showing an inner side of a lower portion of the operation section in the portable terminal equipment according to the embodiment of the present invention. In FIG. 2, the portable terminal equipment of the present invention includes a touch sensor section 5. Further, the touch sensor section 5 includes touch sensors 30 through 41.

The touch sensor section 5 detects that the operation section 1 is pushed down and released from the condition of being pushed down. Besides, when the operation section 1 is rotated, the touch sensor section 5 is rotated together with the operation section 1.

The touch sensors 30 through 41 are provided under the operation keys 10 through 21, respectively. Further, each of the touch sensors 30 through 41 detects whether or not each of the operation keys 10 through 21 located above itself is pushed down.

For example, in a case that the operation key 10 is pushed down, the touch sensor 30 provided under the operation key 10 detects that the operation key 10 is pushed down. Further, when the operation key 10 is released from the condition of being pushed down, the touch sensor 30 detects that the operation key 10 is released from the condition of being pushed down.

Figure 3:
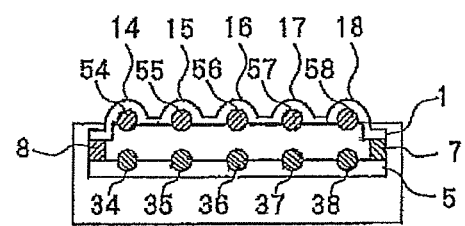
FIG. 3 is a cross sectional view for showing an example of the operation section in the portable terminal equipment according to an embodiment of the present invention, in which the operation section is cut in line with a cutting line illustrated in FIG. 1.

FIG. 3 is a cross sectional view for showing an example of the operation section in the portable terminal equipment according to the embodiment of the present invention, in which the operation section is cut in line with a cutting line illustrated in FIG. 1. Besides, sections or portions in FIG. 3 similar to those of FIGS. 1 and 2 are designated by like reference numerals. In FIG. 3, the portable terminal equipment includes an operation section 1, a touch sensor section 2, securing members 7 and 8.

A circumferential portion (portion indicated by a broken line in FIG. 1) is inserted into a body section of the portable terminal equipment with the circumferential portion being capable of sliding. Thus, this inserted portion is supported by the body section of the portable terminal equipment to be capable of sliding. Thereby, the operation section 1 is capable of rotating with respect to the body section of the portable terminal equipment.

In FIG. 3, illustrated are operation keys 14 through 18 included in the operation section 1 and touch members 54 through 58. Further, touch sensors 34 through 38 included in the touch sensor section 5 are also illustrated in FIG. 3. However, the present invention is not restricted to these.

The securing members 7 and 8 secure the operation section 1 and the touch sensor section 5 with each other so that the touch sensor section 5 may be rotated together with the operation section 1, when the operation section 1 is rotated.

The touch members 54 through 58 are provided under the operation keys 14 through 18. When each of the operation keys 14 through 18 is pushed down, each of the touch members 54 through 58 provided under each of the operation keys 14 through 18 comes to contact with each of the touch sensors provided under each of the touch members 54 through 58.

When any one of the touch sensors 34 through 38 comes to contact with any one of the touch members 54 through 58 located above itself, the any one of the touch sensors 34 through 38 detects that an operation key corresponding to the touch member is pushed down. On the other hand, when any one of the touch sensors 34 through 38 is released from the contact with any one of the touch members 54 through 58 located above itself, the any one of the touch sensors 34 through 38 detects that an operation key corresponding to the touch member is released from a condition of being pushed down.

For example, when the operation key 16 is pushed down, the touch sensor 36 comes to contact with the touch member 56. When the touch sensor 36 comes to contact with the touch member 56, the touch sensor 36 detects that the operation key 16 is pushed down. On the other hand, when the operation key 16 is released from a condition of being pushed down, the touch sensor 36 is released from the contact with the touch member 56. When the touch sensor 36 is released from the contact with the touch member 56, the touch sensor 36 detects that the operation key 16 is released from the condition of being pushed down.

Next, description will proceed to input of characters, numbers and functions by the operation section 1.

A group of characters and functions are assigned to the operation keys 10 through 21 per each operation key. For example, 「あ」、「い」、「う」、「え」、「お」 are assigned to the operation key 11 as the group of characters. Further, the functions as a direction key, a menu key, a determination key, or a speaking key are assigned to the operation keys. Besides, as regards the group of characters, a representative character (for example, 「あ」、「か」、and the like) is determined per each group of characters.

At first, description is made about the input of the characters. The input of the characters is achieved by rotating the operation keys 10 through 21 and by pushing the operation keys 10 through 21 down.

A desirable operation key is pushed down by the user. Thereafter, in a case that the operation section 1 is rotated by a predetermined angle while the desirable operation key is being pushed down, the representative character of the group of characters assigned to the operation key is displayed in the display section 3. Moreover, in a case that the operation section 1 is further rotated while the desirable operation key is being pushed down, characters included in the group of characters assigned to the operation key are sequentially displayed in the display section 3. Further, in a case that the operation key is released from a condition of being pushed down, a character being displayed in the display section 3 at that time is settled.

For example, the operation key 11 is pushed down. Thereafter, in a case that the operation key 11 is rotated by an angle of 30 degrees while the operation key 11 is being pushed down, 「あ」 is displayed in the display section 3. Moreover, in a case that the operation key 11 is further rotated while the operation key 11 is being pushed down, 「い」、「う」、「え」、「お」 are sequentially displayed in the display section 3 every time the operation key 11 is rotated by an angle of 30 degrees. Further, for example, in a case that 「う」 is being displayed in the display section 3 and that the operation key 11 is released from the condition of being pushed down, 「う」 is settled.

Next, description is made about input of functions and numbers. The input of functions and numbers is achieved by pushing the operation keys 10 through 21 down.

When the operation key is pushed down, and thereafter released from the condition of being pushed down without the operation section 1 being rotated, the function assigned to the operation key is executed.

For example, let it be assumed that a number input setting function for setting a number input mode and releasing the setting is assigned to any one of the operation keys 1 through 21. In this case, this operation key is pushed down, and thereafter released from the condition of being pushed down without the operation section 1 being rotated, the number input mode is set on the portable terminal equipment.

In the number input mode, a number is assigned to each operation key. For example, it is assumed that numbers [0] to [9] are assigned to the operation keys 10 through 19. Besides, in this case, the number input setting function is assigned to the operation key 20 or 21 other than the operation keys 10 through 19 to which the numbers are assigned in the number input mode. Hereunder, description will be made on assumption that the number input setting function is assigned to the operation key 20.

Let it be considered that the number input mode is set on the portable terminal equipment. When any one of the operation keys 10 through 19 is pushed down, and thereafter released from the condition of being pushed down without the operation section 1 being rotated, the number assigned to the operation key is settled. On the other hand, let it also be considered that the number input mode is set on the portable terminal equipment. When the operation key 20 is pushed down, and thereafter released from the condition of being pushed down without the operation section 1 being rotated, the settlement of the number input mode is released.

Furthermore, a function as a direction key may be assigned to the operation key. Concretely, a function of an upper direction key is assigned to an operation key located in the upper direction position (In FIG. 1, a position in which the operation key 10 is located). A function of a right direction key is assigned to an operation key located in the right direction position (In FIG. 1, a position in which the operation key 13 is located). A function of a lower direction key is assigned to an operation key located in the lower direction position (In FIG. 1, a position in which the operation key 16 is located). A function of a left direction key is assigned to an operation key located in the left direction position (In FIG. 1, a position in which the operation key 19 is located). In this case, the moving sensor 2 holds an angle of the operation section 1 and renews the angle of the operation section 1, every time the operation section 1 is rotated by 30 degrees. An angle of the operation section 1 is, for example, 0 degree, in a case that the operation key 10 is positioned at the highest position (the position of the operation key 10 in FIG. 1). The angle of the operation section 1 becomes larger by 30 degrees than that of a previous position, every time the operation section 1 is rotated clockwise by 30 degrees from the above highest position.

In a case that the angle of the operation section 1 is, for example, 0 degree, functions as direction keys of upper, right, lower, and left are assigned to the operation keys, 10, 13, 16 and 19, respectively. On the other hand, in a case that the angle of the operation section 1 is 30 degrees, functions as direction keys of upper, right, lower, and left are assigned to the operation keys, 21, 12, 15 and 18, respectively.

Next, description is made about scroll of displayed data displayed in the display section 3. The scroll of displayed data is achieved by rotation of the operation section 1. Concretely speaking, when the operation section 1 is rotated without the operation keys 10 through 21 being pushed down, the displayed data displayed in the display section 3 is scrolled.

Figure 4:
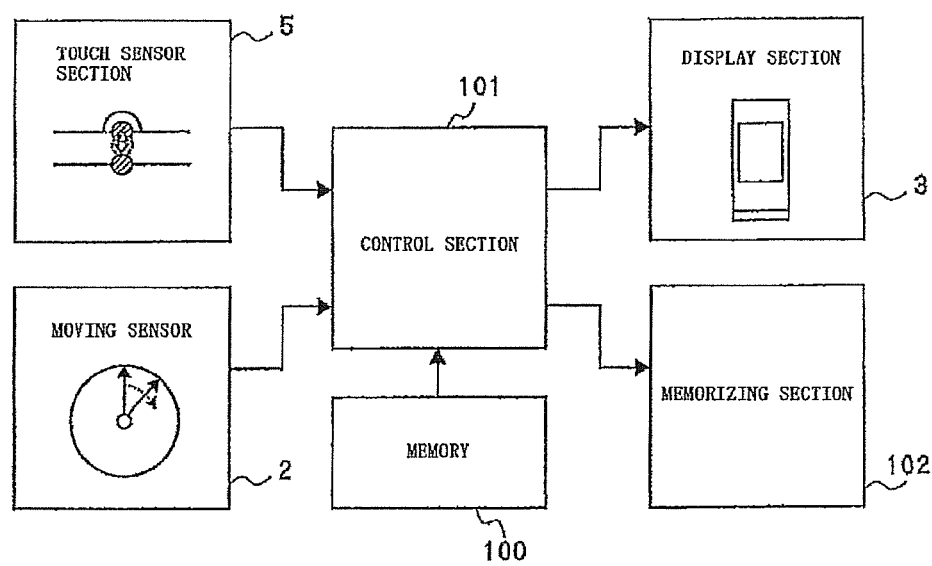
FIG. 4 is a block diagram for showing an example of a constitution of an interface for controlling the portable terminal equipment according to an embodiment of the present invention.

Next, description is made about control of the operation section 1. FIG. 4 is a block diagram for showing an example of a constitution of an interface for controlling the portable terminal equipment according to the embodiment of the present invention. Besides, sections or portions in FIG. 4 similar to those of FIGS. 1 to 3 are designated by like reference numerals.

In FIG. 4, the portable terminal equipment includes a moving sensor 2, a display section 3, a touch sensor section 5, a memory 100, a control section 101, and a memorizing section 102.

The memory 100 is a recording medium which can be read by a CPU and stores a computer program for regulating the control section 101.

The control section 101 is, for example, a CPU and reads the computer program stored in the memory 100. The control section 101 thereby executes the computer program to achieve the following operations.

The control section 101 controls the portable terminal equipment on the basis of results of detections by the moving sensor 2 and the touch sensor section 5.

When the moving sensor 2 detects a rotation of the operation section 1, the control section 101 makes the displayed data displayed in the display section 3 be scrolled.

Concretely speaking, when the moving sensor 2 detects a clockwise rotation (hereunder, referred to right rotation) of the operation section 1, the control section 101 makes the displayed data displayed in the display section 3 be scrolled in a lower direction. On the other hand, when the moving sensor 2 detects a counter-clockwise rotation (hereunder, referred to left rotation) of the operation section 1, the control section 101 makes the displayed data displayed in the display section 3 be scrolled in an upper direction. Alternatively, when the moving sensor 2 detects a right rotation of the operation section 1, the control section 101 may make the displayed data be scrolled in an upper direction. On the other hand, when the moving sensor 2 detects a left rotation of the operation section 1, the control section 101 may make the displayed data be scrolled in a lower direction.

Further, when the touch sensor section 5 detects that the operation key is pushed down, the control section 101 identifies a position of the operation key being pushed down by confirming a current angle of the operation section 1. Identifying the position of the operation key being pushed down, the control section 101 confirms whether or not the moving sensor 2 detects a rotation of the operation section 1 and whether or not the touch sensor section 5 detects that the operation key is released from the position of being pushed down.

When the touch sensor section 5 detects the operation key being pushed down and then detects the operation key being released from the condition of being pushed down, the control section 101 executes a function corresponding to a position of the pushed down operation key. For example, in a case that the operation key 12 is pushed down and that an angle of the operation section 1 is 0 degree, the control section 101 executes a function as a right direction key.

On the other hand, when the moving sensor 2 detects a rotation of the operation section 1 while the touch sensor section 5 is detecting the condition of the operation key being pushed down, the control section 101 makes a character corresponding to the rotation be displayed in the display section 3.

Concretely speaking, when the moving sensor 2 detects a right rotation of the operation section 1 while the touch sensor section 5 is detecting the condition of the operation key being pushed down, the control section 101 makes characters be displayed in the display section 3 in ascending order from the representative character. On the other hand, when the moving sensor 2 detects a left rotation of the operation section 1 while the touch sensor section 5 is detecting the condition of the operation key being pushed down, the control section 101 makes characters be displayed in the display section 3 in descending order from the representative character.

Besides, when the moving sensor 2 detects a right rotation of the operation section 1, the control section 101 may make characters be displayed in the display section 3 in descending order from the representative character. On the other hand, when the moving sensor 2 detects a left rotation of the operation section 1, the control section 101 may make characters be displayed in the display section 3 in ascending order from the representative character. In addition, the ascending order is, for example, a order of 「あ」、「い」、「う」、「え」、「お」、「あ」 while the descending order is, for example, a order of 「あ」、「お」、「え」、「う」、「い」、「あ」.

When the touch sensor section 5 detects that the operation key is released from a condition of being pushed down, the control section 101 makes a character being displayed in the display section 3 at that time be settled. The control section 101 then makes the character be memorized in the memorizing section 102.

Next, description will proceed to actions or operations of the portable terminal equipment according to the present invention.

Figure 5:
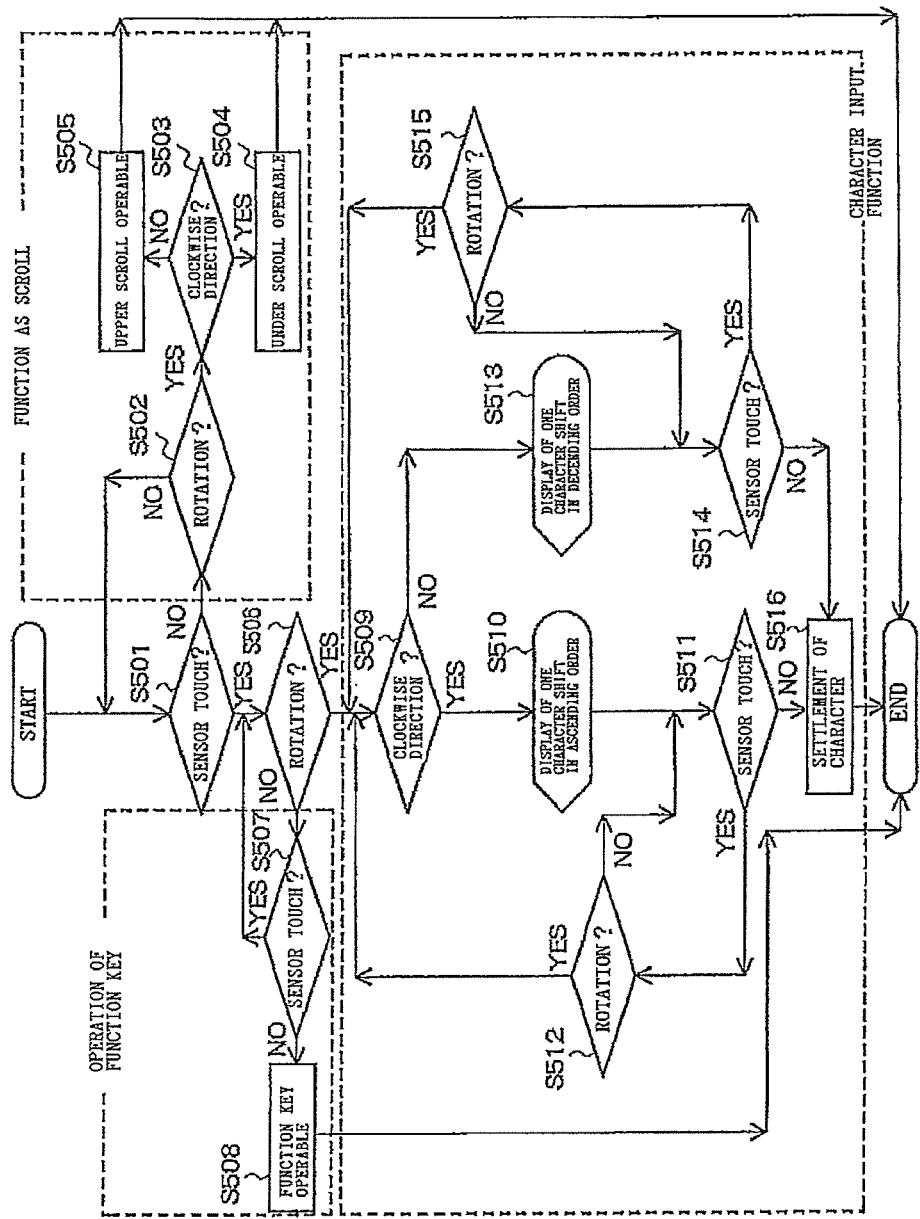
FIG. 5 is a flow chart for explaining an example of actions in the portable terminal equipment according to an embodiment of the present invention.

FIG. 5 is a flow chart for explaining an example of actions in the portable terminal equipment according to the embodiment of the present invention. Besides, the moving sensor 2 always outputs an angle signal indicating an angle of the operation section 1 to the control section 101. The control section 101 confirms the angle of the operation section 1 upon receiving the angle signal.

In step S501, the control section 101 confirms whether or not the touch sensor section 5 has detected that the operation keys 10 through 21 are pushed down. Concretely, the control section 101 confirms whether or not an identification signal for identifying the pushed down operation key is received from the touch sensor section 5.

Besides, when the operation keys 10 through 21 are pushed down, the touch sensor section 5 outputs the identification signal for identifying the pushed down operation key to the control section 101. In addition, the touch sensor section 5 continues to output the identification signal while the operation key is being pushed down.

If the control section 101 receives the identification signal, the control section 101 executes a step S506. On the contrary, if the control section 101 does not receive the identification signal, the control section 101 executes a step S502.

In step S502, the control section 101 confirms whether or not the moving sensor 2 has detected the rotation of the operation section 1. Concretely, the control section 101 confirms whether or not the angle signal received from the moving sensor 2 has been changed.

Besides, when the operation section 1 is rotated, the moving sensor 2 changes an outputting angle signal into a new angle signal indicating an angle of the operation section 1 after the rotation.

If the angle signal is changed, the control section 101 executes a step S503. On the contrary, if the angle signal is not changed, the control section 101 executes a step S501.

In the step S503, the control section 101 compares an angle indicated by a pre-changed angle signal with another angle indicated by a post-changed angle signal, so that the control section 101 judges whether or not the operation section 1 has been rotated in a right direction. If the operation section 1 has been rotated in a right direction, the control section 101 executes a step S504. On the contrary, if the operation section 1 has been rotated in a left direction, the control section 101 executes a step S505.

In the step S504, the control section 101 makes the displayed data displayed in the display section 3 be scrolled in a lower direction. Accordingly, if the operation section 1 is not pushed down and is rotated in a right direction, a display in the display section 3 is scrolled in a lower direction.

In the step S505, the control section 101 makes the displayed data displayed in the display section 3 be scrolled in an upper direction. Accordingly, if the operation section 1 is not pushed down and is rotated in a left direction, a display in the display section 3 is scrolled in an upper direction.

In the step S506, the control section 101 identifies a position of the operation key that was pushed down on the basis of the angle indicated by the angle signal and the identification signal. Identifying the position of the operation key that was pushed down, the control section 101 confirms whether or not the angle signal has been changed. If the angle signal is changed, the control section 101 executes a step S509. On the contrary, if the angle signal is not changed, the control section 101 executes a step S507.

In the step S507, the control section 101 confirms whether or not the touch sensor section 5 detects that the operation keys 10 through 21 are pushed down. Concretely, the control section 101 confirms whether or not the identification signal is received from the touch sensor section 5.

If the identification signal is received, the control section 101 executes a step S506. On the contrary, if reception of the identification signal is stopped, the control section 101 executes a step S508.

In the step S508, the control section 101 executes a function corresponding to a position of the operation key that was pushed down.

In the step S509, the control section 101 judges whether or not the operation section 1 has been rotated in a right direction. If the operation section 1 has been rotated in a right direction, the control section 101 executes a step S510. On the contrary, if the operation section 1 has been rotated in a left direction, the control section 101 executes a step S513.

In the step S510, the control section 101 makes a character of the group of characters assigned to the operation key identified by the identification signal be shifted by one character in ascending order and makes the shifted character be displayed in the display section 3. Besides, in a case that any characters are not displayed in the display section 3, the control section 101 makes the representative character of the group of characters assigned to the operation key identified by the identification signal be displayed in the display section 3. After finishing the step 510, the control section 101 executes a step S511.

In the step S511, the control section 101 confirms whether or not the identification signal is received. If the identification signal is received, the control section 101 executes a step S512. On the contrary, if reception of the identification signal is stopped, the control section 101 executes a step S516.

In the step S512, the control section 101 confirms whether or not the angle signal has been changed. If the angle signal is changed, the control section 101 executes a step S509. On the contrary, if the angle signal is not changed, the control section 101 executes a step S511.

In the step S513, the control section 101 makes a character of the group of characters assigned to the operation key identified by the identification signal be shifted by one character in descending order and makes the shifted character be displayed in the display section 3. Besides, in a case that any characters are not displayed in the display section 3, the control section 101 makes the representative character of the group of characters assigned to the operation key identified by the identification signal be displayed in the display section 3. After finishing the step 513, the control section 101 executes a step S514.

In the step S514, the control section 101 confirms whether or not the identification signal is received. If the identification signal is received, the control section 101 executes a step S515. On the contrary, if reception of the identification signal is stopped, the control section 101 executes a step S516.

In the step S516, the control section 101 makes the character displayed in the display section 3 be settled and makes the settled character be memorized in the memorizing section 102.

According to this embodiment, the characters and the functions are assigned to the operation keys 10 through 21. In addition, the operation keys 10 through 21 are capable of being pushed down, being released from the condition of being pushed down, and sliding. The touch sensor section 5 detects that the operation keys 10 through 21 are pushed down and released from the condition of being pushed down. The moving sensor 2 detects that the operation keys 10 through 21 are slid. The control section 101 executes a function assigned to the operation key, when the touch sensor section 5 detects the operation key being pushed down and then detects the operation key being released from being pushed down. The control section 101 makes a character assigned to the pushed down operation key be displayed, when the moving sensor 2 detects the operation key sliding while the touch sensor section 5 is detecting the operation key being pushed down.

In this case, when the operation key is pushed down and then released from the condition of being pushed down, the function assigned to the operation key is executed. Further, when the operation key is slid while the operation key is being pushed down, the character assigned to the operation key is displayed.

Consequently, it becomes possible that one operation key receives an input of a character as well as an execution of the function. Accordingly, it becomes possible to prevent the operation keys from being increased.

Further, in this embodiment, a group of characters including a plurality of characters are assigned to the operation keys 10 through 21. The control section 101 makes the characters of the group of characters assigned to the pushed down operation key be displayed sequentially in the display section 3, every time the moving sensor 2 detects the operation key sliding while the touch sensor section 5 is detecting the operation key being pushed down. Thereafter, the control section 101 makes the character being displayed in the display section 3 at that time be settled, when the touch sensor section 5 detects the operation key being released from the condition of being pushed down.

In this case, the characters of the group of characters assigned to the pushed down operation key are displayed sequentially, every time the operation key is slid while the operation key is being pushed down. Thereafter, when the operation key is released from the condition of being pushed down, the character being displayed at that time is settled.

Consequently, it becomes possible that numbers of pushing the operation keys down by the user for inputting a character are reduced. Accordingly, it becomes possible to release stress of the user by inputting characters.

Further, in this embodiment, the control section 101 makes the displayed data displayed in the display section 3 be scrolled, when the moving sensor 2 detects the operation section 1 sliding while the touch sensor section 5 is not detecting the operation keys being pushed down.

In this case, it becomes possible to make the displayed data be scrolled without newly adding an operation key to the portable terminal equipment for making the displayed data be scrolled. Accordingly, it becomes possible to prevent the operation keys from being increased.

Further, in this embodiment, the moving sensor 2 detects sliding of the operation keys 10 through 21. The touch sensor section 5 detects that the operation keys 10 through 21 are pushed down and released from the condition of being pushed down.

In this case, it becomes possible to prevent the operation keys from being increased comparatively at low cost.

The operation section 1 of the portable terminal equipment illustrated in FIGS. 1 through 3 slides (rotates) in a circumferential direction. However, the direction of sliding of the operation section is not restricted to the circumferential direction. For example, the operation section may slide in upper and lower directions as well as left and right directions. Hereunder, description will proceed to a portable terminal equipment in which the operation section slides in upper and lower directions as well as left and right directions.

Figure 6:
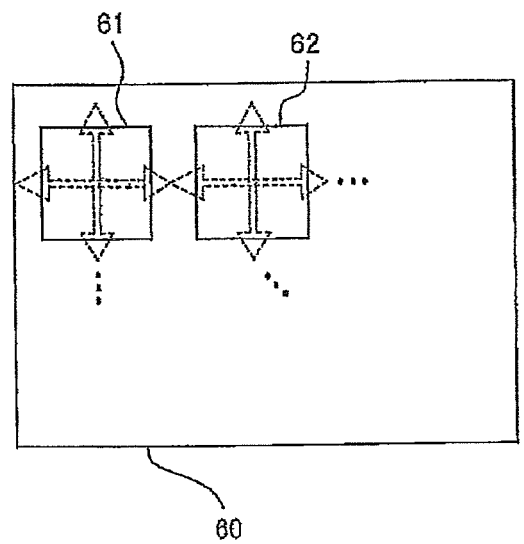
FIG. 6 is a plan view for showing another example of an operation section in the portable terminal equipment according to an embodiment of the present invention.

FIG. 6 is a plan view for showing another example of an operation section in the portable terminal equipment according to an embodiment of the present invention. In FIG. 6, the operation section 60 includes operation keys 61 and 62. Besides, in FIG. 6, numbers of the operation keys are two in order to facilitate an explanation of this embodiment. However, the numbers of the operation keys are actually not restricted to two.

The operation keys 61 and 62 are capable of being pushed down and released from that, and in addition, capable of sliding in upper and lower directions as well as left and right directions, respectively. Further, the operation keys 61 and 62 are connected to moving sensors (not illustrated). Besides, the moving sensors are provided on the operation keys 61 and 62, respectively. Moreover, touch sensor sections (not illustrated) are provided under the operation keys 61 and 62, respectively.

When the operation key 61 or 62 is slid, the moving sensor detects the sliding of the operation key 61 or 62. Concretely speaking, if the operation key 61 or 62 is slid by a predetermined distance in any one of directions of the upper and the lower directions as well as the left and the right directions, the moving sensor detects the sliding of the operation key 61 or 62 and the direction in which the operation key 61 or 62 was slid.

The touch sensor section detects whether or not the operation key 61 or 62 is pushed down.

The control section 101 executes functions and inputs characters on the basis of results of detection by the moving sensor and the touch sensor section.

For example, when the moving sensor detects that the operation key 61 is slid in a right or a left direction while the touch sensor section is detecting that the operation key 61 is being pushed down, the control section 101 makes the representative character 「あ」 be displayed in the display section 3 within the group of characters (「あ」、「い」、「う」、「え」、「お」) assigned to the operation key 61.

Thereafter, when the moving sensor detects that the operation key 61 is slid in a right direction while the touch sensor section is detecting that the operation key 61 is being pushed down, the control section 101 makes characters included in the group of characters assigned to the operation key 61 be displayed in the display section 3 in ascending order. On the other hand, when the moving sensor detects that the operation key 61 is slid in a left direction while the touch sensor section is detecting that the operation key 61 is being pushed down, the control section 101 makes characters included in the group of characters assigned to the operation key 61 be displayed in the display section 3 in descending order.

Further, when the moving sensor detects that the operation key 61 is slid in an upper or a lower direction while the touch sensor section is detecting that the operation key 61 is being pushed down, the control section 101 makes numbers assigned to the operation key 61 be displayed in the display section 3.

Further, when the touch sensor section detects that the operation key 61 is pushed down and then detects that the operation key 61 is released from the condition of being pushed down, the control section 101 executes functions assigned to the operation key 61.

In this case, directions in which the operation key can be slid are increased. Therefore, it becomes possible for the user to input characters and numbers without setting a number input mode in the portable terminal equipment.

In the portable terminal equipment illustrated in FIG. 6, it is necessary to provide a moving sensor per each operation key. Alternatively, it is necessary to provide a specific moving sensor, such as a matrix sensor, or the like.

Figure 7:
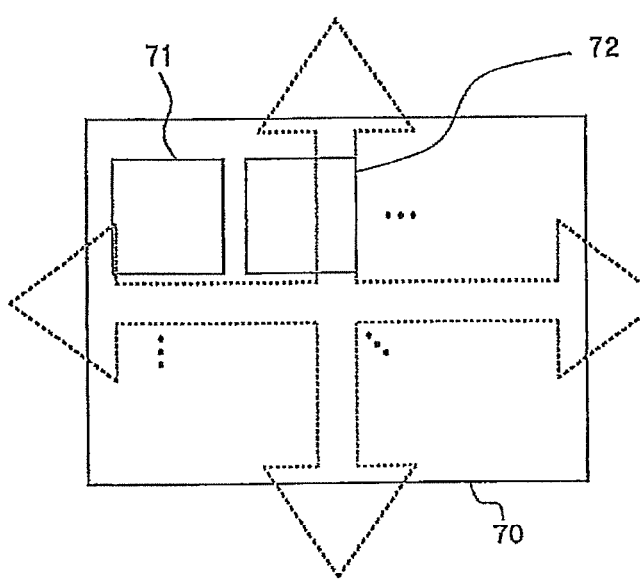
FIG. 7 is a plan view for showing yet another example of an operation section in the portable terminal equipment according to an embodiment of the present invention.

FIG. 7 is a plan view for showing yet another example of an operation section in the portable terminal equipment according to an embodiment of the present invention. In this example, not only directions in which the operation key can be slid are increased but also numbers of moving sensors can be prevented from being increased in a portable terminal equipment. In FIG. 7, the operation section 70 includes operation keys 71 and 72. Besides, in FIG. 7, numbers of the operation keys are two in order to facilitate an explanation of this embodiment. However, the numbers of the operation keys are actually not restricted to two.

The operation section 70 can be slid in upper and lower directions as well as left and right directions. Further, the operation section 70 is connected to moving sensors (not illustrated).

The operation keys 71 and 72 can be pushed down and released from the condition of being pushed down, respectively. When the operation section 70 is slid, the operation keys 71 and 72 are also slid together with the operation section 70. As a result, in order to detect the sliding of the operation keys, it is enough to detect the sliding of the operation section 70. Consequently, the number of moving sensor may be one.

In this case, it becomes possible to prevent numbers of moving sensors from being increased. It therefore becomes possible to reduce a cost of fabricating a portable terminal equipment.

In the embodiments described above, each illustrated constitution is merely an example. The present invention is never restricted to those constitutions.

POSSIBILITY OF INDUSTRIAL USE

The present invention provides new operation keys which can be replaced for conventional operation keys, such as ten keys, function keys, direction keys, and pointing devices, and the like. The operation keys of the present invention have constitutions to which predetermined characters and predetermined functions are assigned and which are capable of being pushed down, released from that, and sliding. The present invention can prevent operation keys from being increased and is capable of reducing the numbers of pushing the operation keys down at the time of input and settlement of characters. Accordingly, a space occupied by operation keys can be small in a portable terminal equipment. Consequently, various functions can be newly added to remaining spaces. Further, an user can be released from a stress accompanied by complicated operations of various operation keys.

The invention claimed is:

1. A portable terminal equipment comprising:
a plurality of operation keys each to which a predetermined character and a predetermined function are assigned, and which are provided in an operation section so as to be capable of each being pushed down, each being released from a condition of being pushed down, and each sliding;
a display section which displays various information;
a touch sensor section which detects each of said operation keys being pushed down and being released from the condition of being pushed down;
a moving detecting section which detects each of said operation keys sliding; and
a control section which executes said predetermined function assigned to each of said operation keys, when said touch sensor section detects each of said operation keys being pushed down and then detects each of said operation keys being released from the condition of being pushed down, said control section making said predetermined character assigned to each of said operation keys be displayed in said display section, when said moving detecting section detects each of said operation keys sliding while said touch sensor section is detecting each of said operation keys being pushed down,
wherein a plurality of characters are assigned to each of said operation keys,
said control section making said plurality of characters assigned to each of said operation keys to be displayed sequentially in said display section, every time said moving detecting section detects each of said operation keys sliding while said touch sensor is detecting each of said operation keys being pushed down,
after said control section making said plurality of characters assigned to each of said operation keys be displayed sequentially in said display section, every time said moving detecting section detects each of said operation keys sliding while said touch sensor section is detecting each of said operation keys being pushed down,
said control section making one of said characters being displayed in said display section at that time be settled, when said touch sensor section detects each of said operation keys being released from the condition of being pushed down,
wherein making said predetermined character assigned to each of said operation keys be displayed in said display section is a function, said function being performed only when each of said operation keys is sliding and each of said operation keys is being pushed down, and no part of said function is performed when each of said operation keys is just sliding and not being pushed down or each of said operation keys is just being pushed and not sliding.

2. A portable terminal equipment as claimed in claim 1,
said control section making said information displayed in said display section be scrolled, when said moving detecting section detects each of said operation keys sliding while said touch sensor section is not detecting each of said operation keys being pushed down.

3. A portable terminal equipment as claimed in claim 1, wherein said touch sensor section comprises a touch sensor located under said operation keys while said moving detecting section comprises a moving sensor.

4. A portable terminal equipment as claimed in claim 1, wherein said a plurality of operation keys are located on a peripheral surface of a circular operation section of which a circumferential portion is inserted into a body section of the portable terminal equipment with the circumferential portion being capable of sliding.

5. A portable terminal equipment as claimed in claim 1, wherein said a plurality of operation keys are located in said operation section with each of the operation keys being capable of sliding.

6. A method of receiving input which is conducted by a portable terminal equipment including operation keys each to which a predetermined plurality of characters and a predetermined function are assigned, and which are capable of each being pushed down, each being released from a condition of being pushed down, and each sliding, a touch sensor section which detects each of said operation keys being pushed down and being released from the condition of being pushed down, a moving detecting section which detects each of said operation keys sliding, and a display section which displays various information, said method comprising the steps of:

an executing step for executing said predetermined function assigned to each of said operation keys, when said touch sensor section detects each of said operation keys being pushed down and then detects each of said operation keys being released from the condition of being pushed down; and a sequential displaying step for displaying said plurality of characters assigned to each of said operation keys sequentially, every time said moving detecting section detects each of said operation keys sliding while said touch sensor section is detecting each of said operation keys being pushed down, after displaying said plurality of characters assigned to each of said operation keys sequentially, every time said moving detecting section detects each of said operation keys sliding while said touch sensor section is detecting each of said operation keys being pushed down, making one of said characters being displayed at that time to be settled, when said touch sensor section detects each of said operation keys being released from the condition of being pushed down, wherein making said predetermined character assigned to each of said operation keys be displayed in said display section is a function, said function being performed only when each of said operation keys is sliding and each of said operation keys is being pushed down, and no part of said function is performed when each of operation keys is just sliding and not being pushed down or each of operation keys is just being pushed and not sliding.

7. A method of receiving input as claimed in claim 6, wherein a scroll step for making said information displayed in said display section be scrolled, when said moving detecting section detects each of said operation keys sliding while said touch sensor section is not detecting each of said operation keys being pushed down.

\* \* \* \* \*